United States Patent [19]

Ohshita et al.

[11] Patent Number: 5,010,488
[45] Date of Patent: Apr. 23, 1991

[54] BEAR-WHEEL CONTROL METHOD FOR A MOTOR VEHICLE WITH A FOUR-WHEEL STEERING SYSTEM

[75] Inventors: Saiichiro Ohshita; Kazuhiro Fukamachi, both of Oota, Japan

[73] Assignee: Fuji Jukogyo Kabushiki Kaisha, Tokyo, Japan

[21] Appl. No.: 352,839

[22] Filed: May 15, 1989

[30] Foreign Application Priority Data

May 16, 1988 [JP] Japan ............................. 63-118579
Jul. 28, 1988 [JP] Japan ............................. 63-189084

[51] Int. Cl.$^5$ ............................. B62D 6/00
[52] U.S. Cl. ............................. 364/424.05; 280/91; 180/142
[58] Field of Search ............................. 364/424.05; 280/91, 280/99; 180/79.1, 140-143

[56] References Cited

U.S. PATENT DOCUMENTS

| 4,666,013 | 5/1987 | Shibahata et al. | 280/91 |
| 4,690,431 | 9/1987 | Ito et al. | 280/91 |
| 4,705,131 | 11/1987 | Shibahata et al. | 280/91 |
| 4,718,685 | 1/1988 | Kawabe et al. | 280/91 |
| 4,834,204 | 5/1989 | Ito et al. | 180/140 |
| 4,840,389 | 6/1989 | Kawabe et al. | 280/91 |

Primary Examiner—Gary Chin
Attorney, Agent, or Firm—Martin A. Farber

[57] ABSTRACT

Rear wheels are controlled based on rear-wheel slip angle ($\beta r$). A desired rear-wheel steering angle ($\delta r$) is expressed as $\delta r = -G(S)kr\beta r$, where $G(S)$ is a derivative transfer function and $kr$ is a steering coefficient. The desired rear-wheel steering angle is applied to a rear-wheel steering control system for controlling the rear wheels to the desired rear-wheel steering angle.

4 Claims, 8 Drawing Sheets

BEAR-WHEEL CONTROL METHOD FOR A MOTOR VEHICLE WITH A FOUR-WHEEL STEERING SYSTEM

BACKGROUND OF THE INVENTION

The present invention relates to a method for controlling rear wheels of a motor vehicle with a four-wheel steering system.

Various systems for steering front wheels and rear wheels have been proposed and developed for improving the stability of steering. Japanese Patent Publication 40-10728 discloses such a system.

The rear-wheel control systems may be divided into two types, one of which is a steering-angle-responsive type and the other is a steering-force-responsive type. In the former, the steering angle of the rear wheels is controlled in proportion to the steering angle of the front wheels. In the latter, the steering angle of the rear wheels is controlled in responce to the steering force for the front and rear wheels. The natural frequency with respect to the steering in the former is the same as a conventional two-wheel steering. On the other hand, the steering-force-responsive type has an advantage that the natural frequency may be set higher than that of the two-wheel steering. However, in the later, the damping of yawing with respect to the steering reduces compared with the two-wheel steering. Namely, the steering-force-responsive type has a disadvantage that there is a larger peak in frequency characteristic of the gain of yawing rate than that of the two-wheel steering The steering force and the side force (cornering force) on a wheel is assumed to be proportional to the slip angles of the wheel. Thus, the steering-force-responsive type may be further divided into two types, one of which is a front-wheel steering force responsive type and the other is a rear-wheel steering force responsive type. In the former, the steering angle of the rear wheels is controlled in proportion to the slip angle of the front wheels and in the latter, the rear-wheel steering angle is controlled in proportion to the slip angle of the rear wheels. Since the latter controls the rear-wheel steering angle in accordance only with conditions of the rear wheel, the latter is superior to the former.

However, the latter also has the above-described disadvantage that a larger peak exists in the frequency characteristic of the gain than that of the two-wheel-steering.

SUMMARY OF THE INVENTION

The object of the present invention is to provide a rear-wheel control method for a four-wheel steering motor vehicle which eliminates the above described disadvantages.

According to the present invention, there is provided a method for controlling rear wheels of a four-wheel steering vehicle having a rear-wheel steering control system, comprising detecting rear-wheel slip angle ($\beta r$), providing a desired rear-wheel steering angle ($\delta r$) expressed as $$\delta r = -G(S) k r \beta r$$

where G(S) is a derivative transfer function including a proportional term 1 and kr is a steering coefficient, and applying the desired rear-wheel steering angle to the rear-wheel steering control system for controlling the rear wheels to the desired rear-wheel steering angle.

In an aspect of the invention, the derivative transfer function including a proportional term is $$G(S) = 1 + \frac{aTS}{1 + TS} = \frac{1 + (1 + a)TS}{1 + TS}$$

where T is a time constant of the rear-wheel steering control system and $a$ is a proportional gain.

In another aspect of the invention, the derivative transfer function is $$G(S) = \frac{aTS}{1 + TS}$$

The other objects and features of this invention will become understood from the following description with reference to the accompanying drawings.

DETAILED DESCRIPTION OF THE PREFERRED EMBODIMENTS

Figure 1:
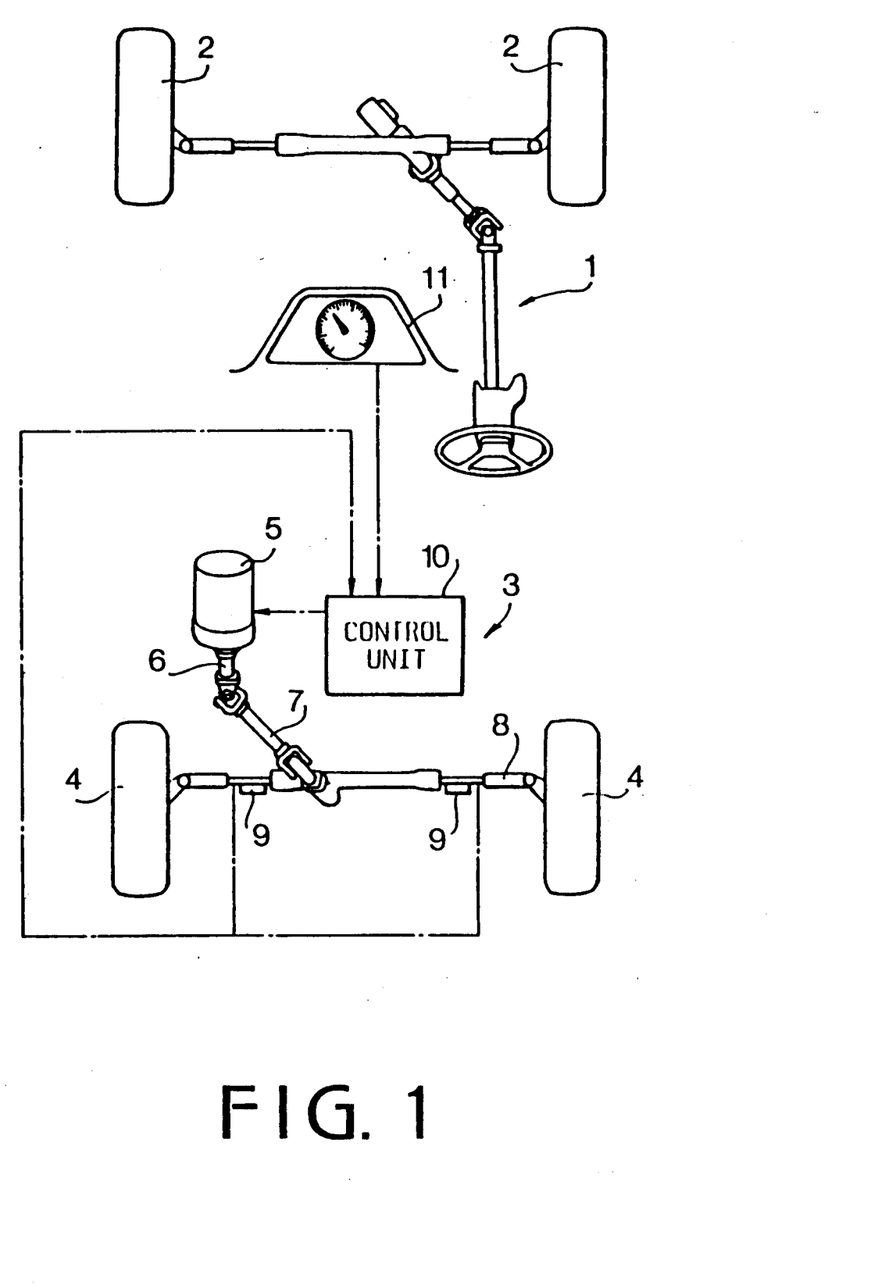
FIGS. 1 and 2 show steering systems to which the present invention is applied.

Referring to FIG. 1 showing a steering system to which the present invention is applied, the system comprises a front-wheel steering system 1 for front wheels 2 and a rear-wheel steering system 3 for rear wheels 4. The rear steering system 3 is a rack-and-pinion type and comprises a motor 5, an output shaft 6 of a reduction gear device attached to the motor 5 and a pinion shaft 7. A pinion of the pinion shaft 7 is engaged with a rack provided on a rack shaft 8.

Strain gauges 9 as rear-wheel side force sensors are attached to the rack shaft 8 for detecting the axial force on the rack shaft which is generated by the rear-wheel side force. Output signals of the strain gauges 9 are applied to a control unit 10 The control unit 10 is also applied with an output signal of a vehicle speed sensor 11 and controls the rear wheels 4 as described hereinafter.

Figure 2:
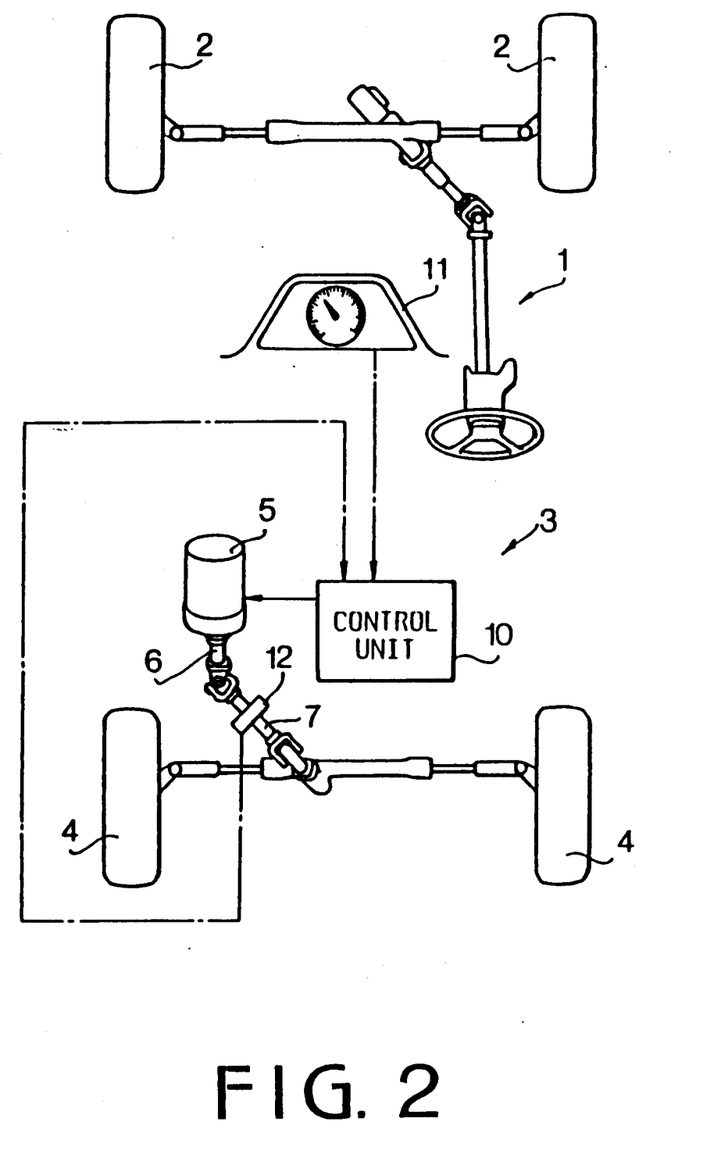

In a steering system shown in FIG. 2, a torque sensor 12 is provided on the pinion shaft 7 as a detector for the rear-wheel side force.

Figure 3:
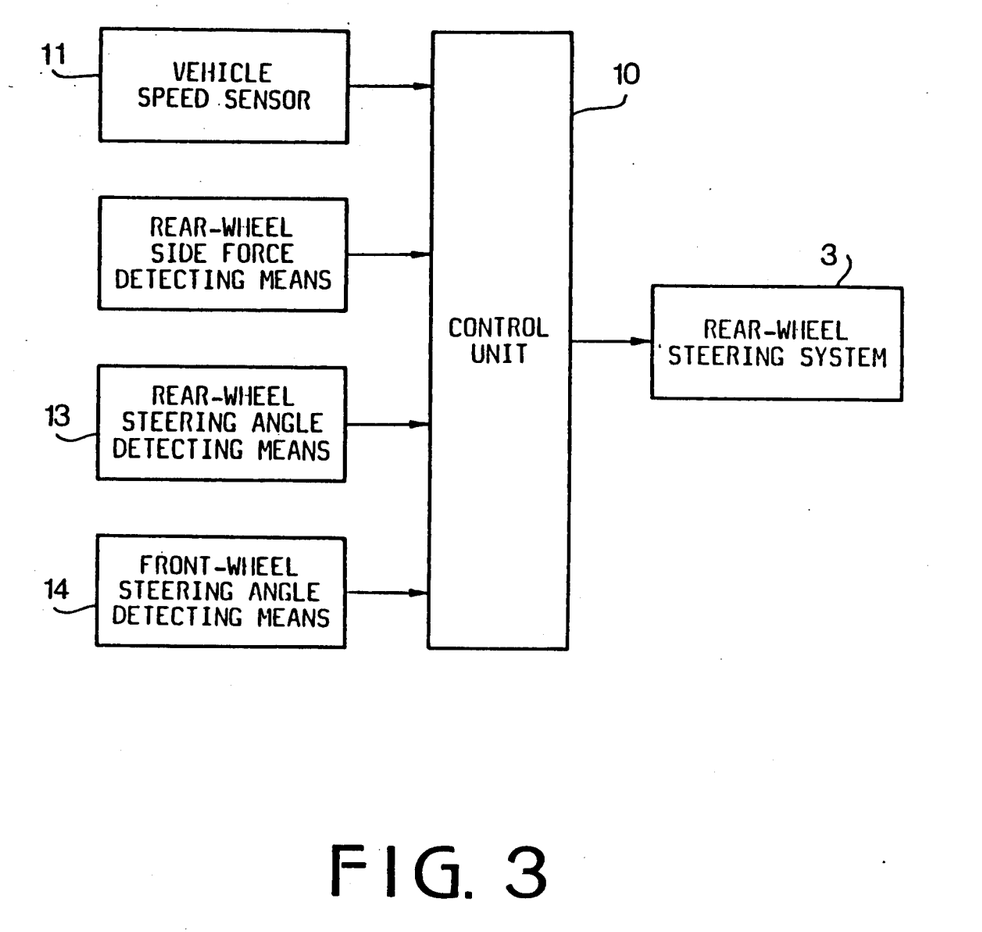
FIG. 3 is a block diagram showing a control system according to the present invention.

Referring to FIG. 3, the control unit 10 is further applied with an output signal of rear-wheel steering angle detecting means 13 and an output signal of front-wheel steering angle detecting means 14.

Figure 4:
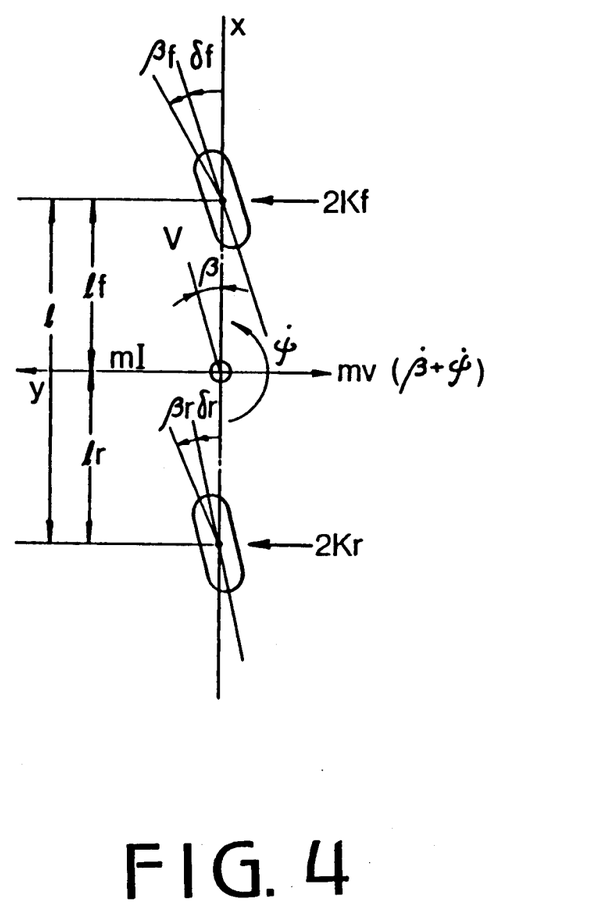
FIG. 4 is a schematic illustration showing a model of a front wheel and a rear wheel of a four-wheel steering motor vehicle.

Referring to FIG. 4 showing an example of a front wheel and a rear wheel of a four-wheel steering motor vehicle, δf is the steering angle of the front wheel, βf is the slip angle of the front wheel, δr is the steering angle of the rear wheel, and βr is the slip angle of the rear wheel. If the steering force and side force of each of the front wheel and the rear wheel are proportional to the slip angle, the steering angle of the rear wheel δr is controlled in accordance with the following equations.

The rear wheel steering angle δr of the front wheel steering angle responsive type is $$\delta r = \kappa \delta f \tag{1}$$

The rear wheel steering angle δr of the front wheel steering force responsive type is $$\delta r = -\kappa f \, \beta f \tag{2}$$

The rear wheel steering angle δr of the rear wheel steering force responsive type is $$\delta r = -\kappa r \, \beta r \tag{3}$$

where k, kf and kr are steering coefficients which are functions of vehicle speed V.

FIGS. 5a to 6b show graphs of the frequency response characteristics of yawing rate and lateral acceleration with respect to steering in the four-wheel steering system, respectively. In the graphs, curves I represent characteristics dependent on the equation (1). Curves II represent characteristics dependent on the equation (2) and curves III represent characteristics dependent on the equation (3). Curves 2WS represent characteristics of a conventional two-wheel steering system.

Figure 5A:
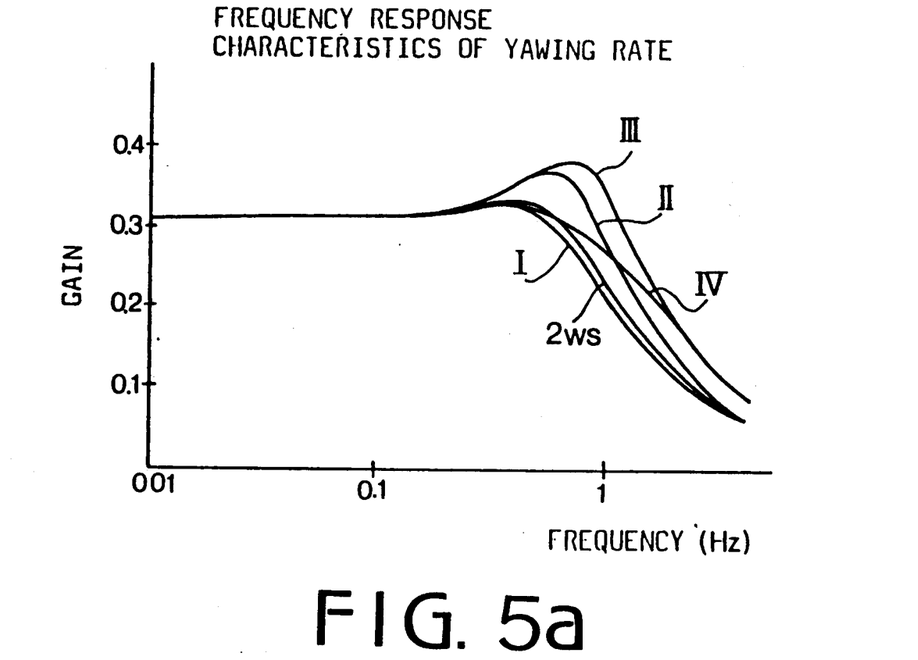
FIGS. 5a and 5b are graphs showing frequency response characteristics of yawing rate with respect to steering.
Figure 5B:
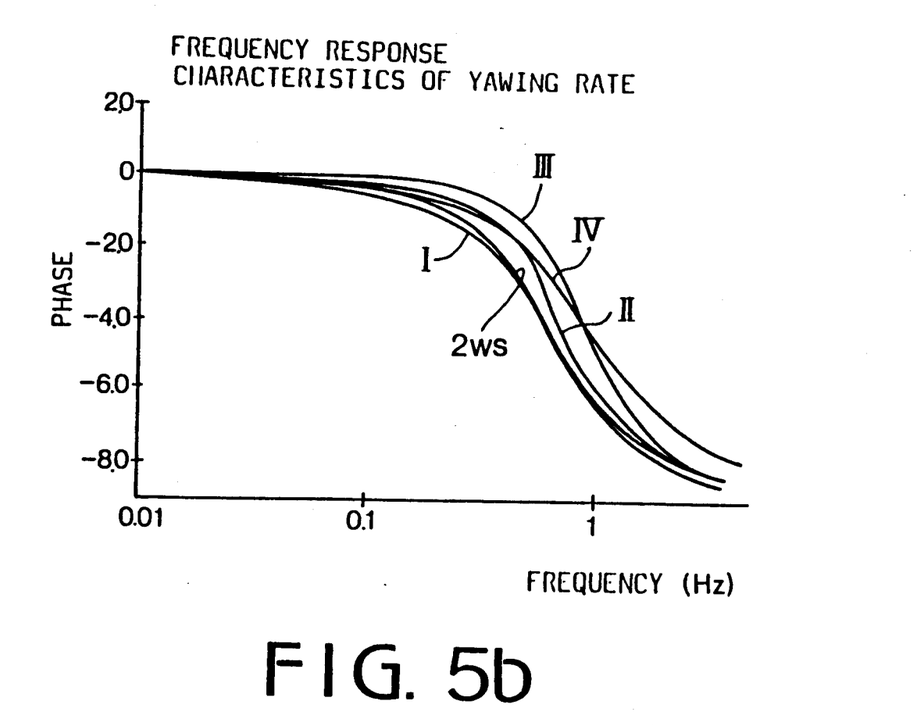

It will be seen from the curves I that the frequency characteristics of the yawing rate of the system of the front wheel steering angle responsive type is substantially the same as the curves 2WS. On the other hand, the natural frequencies of the systems of the steering force responsive types of equations (2) and (3) are higher than those of the two-wheel steering system as shown by curves II, III and 2WS. However, the damping for the characteristic reduces so that the yawing rate gain has a high peak in a frequency range.

The present invention is to provide a method which may reduce the peak in the characteristic of the rear wheel steering force responsive type.

According to the present invention, the rear-wheel steering force or rear-wheel side force (cornering force), or rear-wheel slip angle is detected, and a control signal (desired signal) having a proportional plus derivative (advanced phase) characteristic or a proportional plus phase-lead characteristic is obtained based on the detected parameter. The rear-wheels are controlled with the control signal.

If the rear-wheel steering force or the rear-wheel side force is proportional to the rear-wheel slip angle βr, or method for controlling the rear-wheel steering angle δr (desired steering angle) is expressed as follows.

$$\delta r = -G(S) \kappa r \, \beta r \tag{4}$$

where G(S) is the derivative transfer function having a proportional term.

Curves IV shown in the graphs of FIGS. 5a to 6b represent characteristics obtained by the equation (4). It will be seen that although the peak of the yawing rate characteristic is substantially the same as the curve I, the gain is increased in a high frequency region, thereby providing a flat characteristic. Further, phase delay is extremely reduced compared with the curve I so that the steering characteristic and driveability of the motor vehicle is improved. The lateral acceleration characteristic is the same as the yawing rate characteristic.

The derivative transfer function G(S) in the equation (4) is expressed as $$G(S) = 1 + \frac{\alpha TS}{1 + TS} = \frac{1 + (1 + \alpha)TS}{1 + TS} \tag{5}$$

where α is the proportional gain and T is the time constant of a derivative function.

The equation (5) is described hereinafter.

Figure 7A:
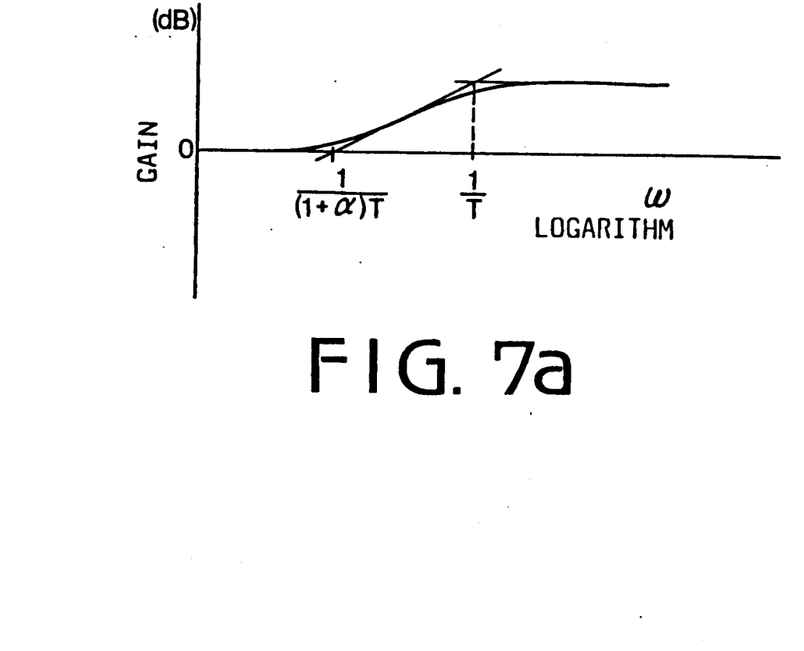
FIGS. 7a and 7b show a Bode diagram relating to transfer functions.
Figure 7B:
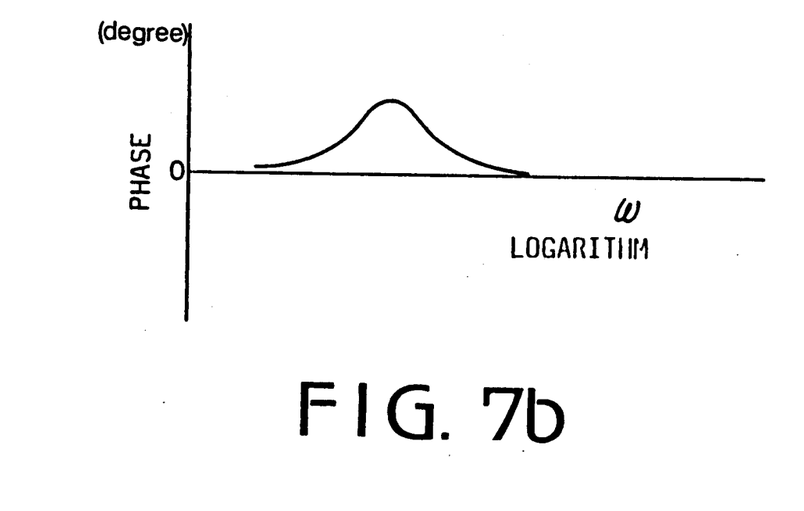

FIGS. 7a and 7b show a Bode diagram relating to the transfer function when α>0. As shown in FIG. 7a, when frequency f is $$f < \frac{1}{2\pi(1 + \alpha)T},$$

and the gain g is $g \approx 0$[db]. Since the transfer function is $|G(S)| \approx 1$, the rear-wheel steering angle δr is $\delta r = -\kappa r \, \beta r$. When $$\frac{1}{2\pi(1 + \alpha)T} \leq f \leq \frac{1}{2\pi T},$$

the gain and the transfer function are $$0 < g \leq 20\log_{10} \sqrt{\frac{\alpha^2 + 2\alpha + 2}{2}} \quad \text{[dB] and}$$

$$1 < |G(S)| \leq \sqrt{\frac{\alpha^2 + 2\alpha + 2}{2}}.$$

Therefore, the rear-wheel steering angle δr is $$-\kappa r \beta r < \delta r \leq -\sqrt{\frac{\alpha^2 + 2\alpha + 2}{2}} \, \kappa r \beta r.$$

When $f > \frac{1}{2\pi T}$, the gain and transfer function are $a \approx 20 \log 10(1+\alpha)$ [db] and $|G(S)| \approx 1+\alpha$. Therefore, the rear-wheel steering angle δr is $\delta r = -(1+\alpha)\kappa r \, \beta r$.

In other words, in the frequency range of $$f < \frac{1}{2\pi(1 + \alpha)T}$$

having no peak, the gain is $\delta r = -\kappa r \, \beta r$. In the frequency range of $$\frac{1}{2\pi(1 + \alpha)T} \leq f \leq \frac{1}{2\pi T}$$

having a peak, the in-phase rear-wheel steering angle, in which the rear-wheel steering angle is in phase of the front-wheel, is increased to a large value which is $$\sqrt{\frac{a^2 + 2a + 2}{2}}$$

times as large as that of the frequency range of the function $$\left( f < \frac{1}{2\pi(1 + a)T} \right),$$

thereby flatering the gain. In the high frequency range of $$f > \frac{1}{2\pi T},$$

the rear-wheel steering angle $\delta r = -(1+a)\kappa r\ \beta r$ is maintained without increasing the in-phase steering angle to prevent decrease of the gain. Thus, preferable frequency response characteristics can be obtained as shown by curves IV in FIGS. 5a and 5b.

Figure 6A:
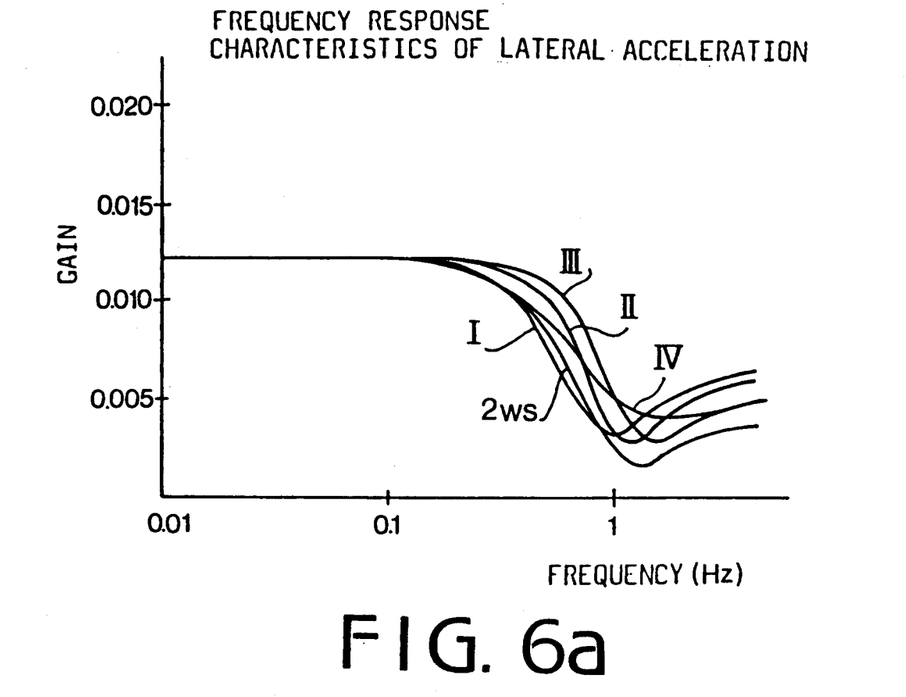
FIGS. 6a and 6b are graphs showing frequency response characteristics of lateral acceleration with respect to steering.
Figure 6B:
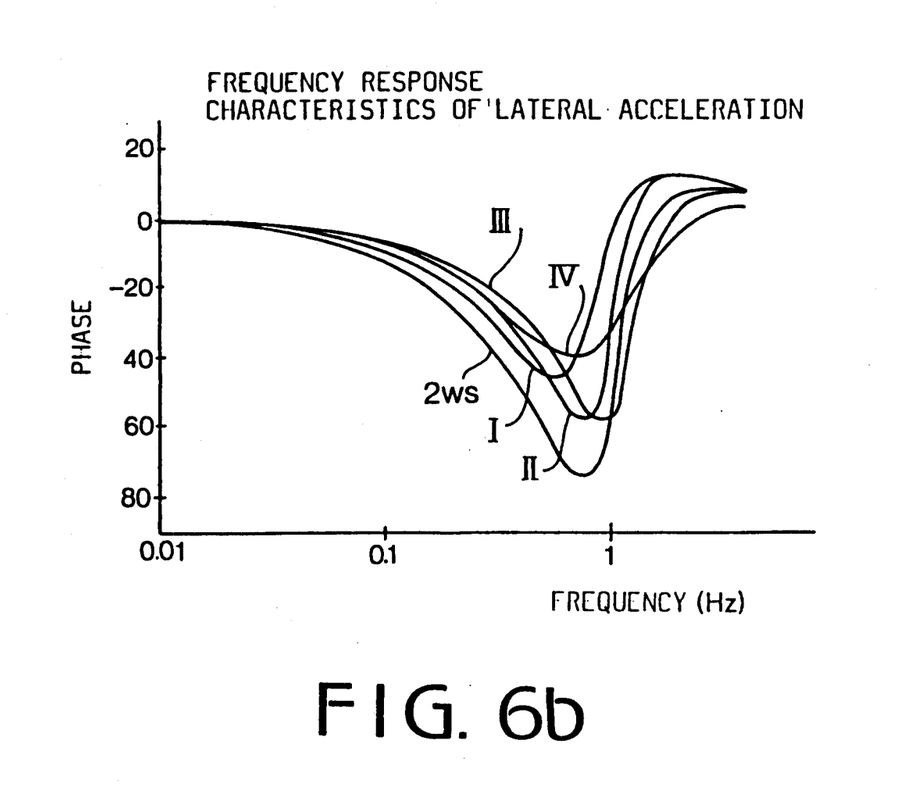

Similarly, it will be seen that the curves IV shown in FIGS. 6a and 6b have preferable characteristics.

In the four-wheel steering system having a phase-lead characteristic of $$\left( 1 + \frac{aTS}{1 + TS} \right)$$

of equation (5), if the proportional gain $a$ is $$0 < a < \frac{1 - \kappa r}{\kappa r} \quad (6)$$

(where $0 < \kappa r < 1$), the response at fixed control is stabilized as described hereinafter.

The equation of motion in a lateral direction (in the Y axis direction) and the equation of motion in a yawing moment direction about the center of gravity (in the Z axis direction) are expressed as $$mV(\dot\beta + \dot\psi) + 2\left\{ (Kf + kr)\beta + \left( \frac{Kflf - krlr}{V} \right)\dot\psi \right\} = \qquad (7)$$

$$2Kf\delta f + 2kr\delta r$$

$$I\ddot\psi + 2(Kflf - krlr)\beta + \frac{2(Kflf^2 + krlr^2)}{V} \dot\psi = \qquad (8)$$

$$2Kflf\delta f - 2krlr\delta r$$

where
m is the mass of a vehicle body,
V is the vehicle speed,
$\beta$ is the slip angle of the vehicle body,
$\psi$ is the yawing angular velocity,
Kf is the front wheel cornering power,
kr is the rear wheel cornering power,
l is the wheel base,
lf is the distance from the front wheels to the center of gravity of the vehicle,
lr is the distance from the rear wheels to the center of gravity of the vehicle, and
I is the yawing moment of inertia.

The equations (7) and (8) are expressed with the Laplace transformation as follows.

$$\begin{pmatrix} mVS + 2\left\{ Kf + \dfrac{kr}{1 - \left(1 + \dfrac{aTS}{1+TS}\right)\kappa r} \right\} & mV + \dfrac{2\left\{ Kflf - \dfrac{krlr}{1 - \left(1 + \dfrac{aTS}{1+TS}\right)\kappa r} \right\}}{V} \\ 2\left\{ Kflf - \dfrac{krlr}{1 - \left(1 + \dfrac{aTS}{1+TS}\right)\kappa r} \right\} & IS + \dfrac{2\left\{ Kflf^2 + \dfrac{krlr^2}{1 - \left(1 + \dfrac{aTS}{1+TS}\right)\kappa r} \right\}}{V} \end{pmatrix} \begin{pmatrix} \beta \\ \psi \end{pmatrix} = \begin{pmatrix} 2Kf\delta f \\ 2Kflf\delta f \end{pmatrix} \qquad (9)$$

A characteristic equation is $$\left| \begin{array}{c} mVS + 2\left\{ Kf + \dfrac{kr}{1 - \left(1 + \dfrac{\alpha TS}{1 + TS}\right)\kappa r} \right\} mV + \dfrac{2\left\{ Kflf - \dfrac{krlr}{1 - \left(1 + \dfrac{\alpha TS}{1 + TS}\right)\kappa r} \right\}}{V} \\ 2\left\{ Kflf - \dfrac{krlr}{1 - \left(1 + \dfrac{\alpha TS}{1 + TS}\right)\kappa r} \right\} IS + \dfrac{2\left\{ Kflf^2 + \dfrac{krlr^2}{1 - \left(1 + \dfrac{\alpha TS}{1 + TS}\right)\kappa r} \right\}}{V} \end{array} \right| = 0 \quad (10)$$

Developing the equation (10), $$as^3 + bs^2 + cs + d = 0 \quad (11)$$

where $$a = T\left(1 - \dfrac{\alpha \kappa r}{1 - \kappa r}\right) \quad (12)$$

$$b = 1 + T\left[ \dfrac{2m\left\{ Kflf^2\left(1 - \dfrac{\alpha \kappa r}{1 - \kappa r}\right) + \dfrac{krlr^2}{1 - \kappa r} \right\} + 2I\left\{ Kf\left(1 - \dfrac{\alpha \kappa r}{1 - \kappa r}\right) + \dfrac{kr}{1 - \kappa r} \right\}}{mIV} \right] \quad (13)$$

$$C = \dfrac{2m\left(Kflf^2 + \dfrac{krlr^2}{1 - \kappa r}\right) + 2I\left(Kf + \dfrac{kr}{1 - \kappa r}\right)}{mIV} + \left(d + \dfrac{2\alpha \kappa r}{I(1 - \kappa r)}\right)T \quad (14)$$

$$d = \dfrac{4Kfkrlr^2}{mIV^2(1 - \kappa r)} - \dfrac{2\left(Kflf - \dfrac{krlr}{1 - \kappa r}\right)}{I} = \dfrac{4Kfkrlr^2}{mIV^2(1 - \kappa r)}(1 + ArV^2) \quad (15)$$

Ar is the stability factor of the rear-wheel steering force responsive type of the four-wheel steering system which is represented as $$Ar = -\dfrac{m(Kflf - krlr)}{2Kfkrlr^2} + \kappa r \dfrac{mlf}{2krlr^2} \quad (16)$$

In the equation (16), $$-\dfrac{m(Kflf - krlr)}{2Kfkrlr^2}$$

is the stability factor A of the two-wheel steering vehicle and A>0.

The stability of the characteristic equation (11) is determined with the Routh-stability criterion. The equation (11) is determined to be stabilized when the following conditions are satisfied.

(necessary condition)

Signs of coefficients a, b, c and d in each term are the same.

(sufficient condition)

Signs of coefficients $$a, b, e = \dfrac{bc - ad}{b}, f = \dfrac{ed - b \cdot 0}{e} (= d)$$

are the same. From the equation (15), it is evident that the coefficient d is d>0. If the coefficient a is $$a = T\left(1 - \dfrac{\alpha \kappa r}{1 - \kappa r}\right) > 0, \text{ namely } 0 < \alpha < \dfrac{1 - \kappa r}{\kappa r},$$

(where $0 < \kappa r < 1$)

(necessary condition)

Coefficients b, c and d become b>0, c>0, d>0 respectively. Thus, coefficients a, b, c and d become the same in sign.

$$bc - ad = (1 + Tb')\left[c' + \left(d + \dfrac{2\alpha \kappa r}{I(1 - \kappa r)}\right)T\right] - T\left(1 - \dfrac{\alpha \kappa r}{1 - \kappa r}\right)d$$

$$= (1 + Tb')\left\{c' + \dfrac{2\alpha \kappa r}{I(1 - \kappa r)} T\right\} + (1 + Tb')dT - \left(1 - \dfrac{\alpha \kappa r}{1 - \kappa r}\right)dT$$

$$= (1 + Tb')\left\{c' + \dfrac{2\alpha \kappa r}{I(1 - \kappa r)} T\right\} + \left(Tb' + \dfrac{\alpha \kappa r}{1 - \kappa r}\right)dT > 0$$

Therefore, coefficient e becomes $$e = \dfrac{bc - ad}{b} > 0$$

and coefficients a, b, c and d become the same in sign. In the above equation, b' is a term in each bracket of the equation (13) and c' is the first term of the equation (14).

In the second embodiment of the present invention, the derivative transfer function G(S) is expressed as $$G(S) = \frac{aTS}{1 + TS} \quad (17)$$

The equation (17) is described hereinafter.

Figure 8A:
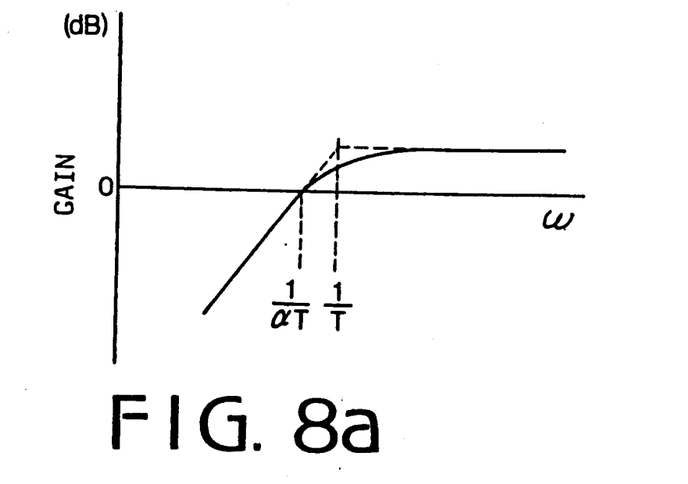
FIGS. 8a and 8b show a Bode diagram relating to the transfer functions for a second embodiment of the present invention.
Figure 8B:
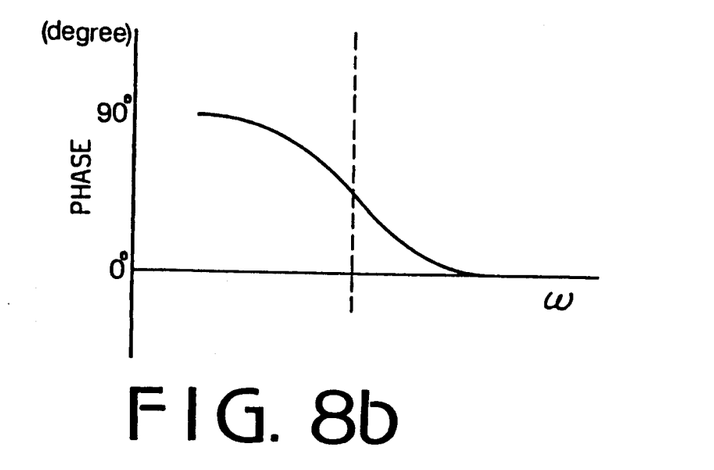

FIGS. 8a and 8b show a Bode diagram of the transfer function. As shown in the figure, when frequency f is $$f < \frac{1}{2\pi aT},$$

the gain g and the transfer function G(S) are g<0 [dB], |G(S)|<1. Thus, the rear-wheel steering angle δr is δr<−kr βr. As the frequency f becomes small, the transfer function G(S) becomes |G(S)|=0. Thus, the rear wheel steering angle δr becomes δr≈0. The steady-state gain becomes nearly equal to that of the two-wheel steering system. This is the main point of the second embodiment.

When $$f = \frac{1}{2\pi aT},$$

the gain and the transfer function are δ=0[dB], |G(S)|−1. The rear-wheel steering angle δr is δr=−κr βr.

When $$f > \frac{1}{2\pi aT},$$

the gain and the transfer function are g>0[dB], |G(S)|>1. The rear wheel steering angle δr is δr>−κr βr. In the frequency range of $$\frac{1}{2\pi aT} < f < \frac{1}{2\pi T},$$

the transfer function G(S) increases in proportion to the frequency until the transfer function becomes a value A larger than 1. Thus, the in-phase rear-wheel steering angle (the rear-wheel is steered in the same direction as the front-wheel) is gradually increased to a valve which is A times as large as that of the conventional two-wheel steering system, thereby reducing of gain. In the high frequency region of $$f > \frac{1}{2\pi T},$$

the rear-wheel steering angle δr=−αkr βr is maintained to increase the in-phase steering angle to prevent decrease of the gain. Thus, preferable frequency response characteristics can be obtained.

Figure 9:
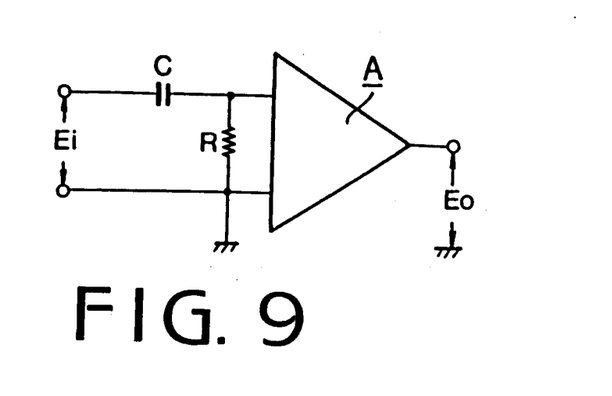
FIG. 9 is a circuit for explaining a derivative transfer function.

FIG. 9 is a circuit representing the derivative transfer function where T=CR.

In accordance with the present invention, a large peak in the frequency characteristics of the yawing rate gain is eliminated. The drop of the yawing rate gain at high frequency range is prevented, thereby providing a flat gain characteristic and response delay is reduced. Thus, the four-wheel steering system having excellent characteristics is provided for the motor vehicle.

While the presently preferred embodiments of the present invention have been shown and described, it is to be understood that this disclosure is for the purpose of illustration and that various changes and modifications may be made without departing from the scope of the invention as set forth in the appended claims.

We claim:

1. A method for controlling rear wheels of a four-wheel steering vehicle having a rear-wheel steering control system, comprising the steps of;
    detecting rear-wheel slip angle (βr);
    providing a transfer function (G(s)) including at least a derivative element;
    calculating a desired rear-wheel steering angle (δr) upon an equation based on said rear-wheel slip angle and said transfer function expressed as $$\delta r = -G(S) \, kr \, \beta r$$

where kr is a steering coefficient; and
    applying the desired rear-wheel steering angle to the rear-wheel steering control system for controlling the rear wheels to the desired rear-wheel steering angle.

2. The method according to claim 1, wherein said transfer function is $$G(S) = \frac{aTS}{1 + TS}$$

where T is a predetermined time constant of the derivative element, α is an optional proportional gain and S is a Laplace operator.

3. The method according to claim 1, wherein said transfer function includes a proportional element and is expressed as $$G(S) = 1 + \frac{aTS}{1 + TS} = \frac{1 + (1 + a)TS}{1 + TS}$$

where T is a predetermined time constant of the derivative element, α is an optional proportional gain and S is a Laplace operator.

4. The method according to claim 3, wherein the proportional gain (α) is $$0 < \alpha < (1-kr)/kr \quad (0 < kr < 1)$$

* * * * *